United States Patent [19]

Kotajima

[11] Patent Number: 4,955,848
[45] Date of Patent: Sep. 11, 1990

[54] TRANSFER DEVICE OF FOUR-WHEEL-DRIVE VEHICLE

[75] Inventor: Takao Kotajima, Tokyo, Japan

[73] Assignee: Fuji Jukogyo Kabushiki Kaisha, Tokyo, Japan

[21] Appl. No.: 402,449

[22] Filed: Sep. 1, 1989

[30] Foreign Application Priority Data

Sep. 21, 1988 [JP] Japan .................. 63-124215[U]

[51] Int. Cl.⁵ .......................................... F16H 11/02
[52] U.S. Cl. ..................................... 474/28; 74/865; 474/18
[58] Field of Search ............... 474/8, 11, 12, 17, 18, 474/28, 69, 70; 74/865–869

[56] References Cited

U.S. PATENT DOCUMENTS

| | | | |
|---|---|---|---|
| 4,610,183 | 9/1986 | Nobumoto et al. | 474/28 X |
| 4,627,313 | 12/1986 | Sakai | 474/28 X |
| 4,680,991 | 7/1987 | Miyawaki | 474/28 X |
| 4,850,938 | 7/1989 | Yamada | 474/28 |
| 4,867,732 | 9/1989 | Soga et al. | 474/28 |

FOREIGN PATENT DOCUMENTS 61-21829  1/1986  Japan .

*Primary Examiner*—Thuy M. Bui
*Attorney, Agent, or Firm*—Beveridge, DeGrandi & Weilacher

[57] ABSTRACT

In a part-time (selective) four-wheel-drive vehicle, the engine driving power is selectively transmitted to the rear (or front) wheels by way of a transfer clutch which is operated by a hydraulic actuator acting through a rail and a sleeve of the dog clutch and being controllable by a changeover valve operated by a solenoid which is controlled by a four-wheel-drive switch manipulative by the driver.

7 Claims, 2 Drawing Sheets

TRANSFER DEVICE OF FOUR-WHEEL-DRIVE VEHICLE

BACKGROUND OF THE INVENTION

The present invention relates generally to four-wheel-drive systems of vehicles and more particularly to a transfer device for changing distribution of driving power between two-wheel drive and four-wheel-drive in a part-time (or selective) type of four-wheel-drive vehicles. More specifically, the present invention relates to a transfer device of the above stated character including a system for engaging and disengaging a transfer clutch (or jaw clutch) by using a hydraulic actuator.

Relative to the part-time type four-wheel-drive vehicles of this kind, the present inventor has previously made a number of proposals. These proposals were based on the two-wheel drive systems of front engine front drive (FF), rear engine rear drive (RR), and front engine rear drive (FR). In each case, driving power is transmitted to the front or the rear wheels through engagement of a transfer clutch of a transfer device at the time of four-wheel-drive. The transfer clutch is generally actuated by either of two methods. One is a manual method in which the driver actuates the transfer clutch directly by manipulating a lever. The other is a power-actuating method using a motive power source.

Power-actuating transfer devices have been known as disclosed, for example, in Japanese Patent Laid-Open Publication (Kokai) No. 61-21829. In the case of this device, a rail on the side of a sleeve of the transfer clutch of the transfer device is coupled to an actuator of diaphragm type. The negative pressure in the intake pipe is utilized to operate a diaphragm actuator. Thus the rail and the sleeve are moved forwardly or rearwardly. As a result, the transfer clutch is engaged or disengaged.

In this transfer device of the prior art, the actuator of the transfer clutch is of a diaphragm type utilizing the negative pressure of the engine intake pipe. For this reason, it possesses the advantage of being applicable also to a manual type transmission. However, the actuator capacity is large. For this reason the cost becomes high. Furthermore, the place of mounting the actuator is restricted. In addition, the negative pressure of the engine intake pipe is utilized. As a consequence, there arise problems such as failing to change over when the negative pressure is low at the time of high load.

SUMMARY OF THE INVENTION

An object of the present invention is to provide a transfer device of a four-wheel-drive vehicle capable of making compact and of improving its changeover operation through the use of a transfer clutch actuator of hydraulic type.

According to the present invention, briefly summarized, there is provided a transfer device of a four-wheel-drive vehicle in which driving power of the engine is transmitted directly to either of the front and the rear wheels and is transmitted selectively to the other wheels by way of a transfer clutch of a transfer device, said device comprising: a shiftable sleeve forming a member of the transfer clutch; a rail movable in reciprocating movement to shift said sleeve thereby to engage or disengage said dog clutch; a hydraulic actuator for actuating said rail in said reciprocating movement; hydraulic pressure supply means for supplying hydraulic pressure to said hydraulic actuator; a changeover valve for controlling the hydraulic pressure to be applied to the hydraulic actuator; a solenoid for controllably actuating said changeover valve; and a four-wheel-drive switch for controlling said solenoid by supplying or cutting off energizing current to or from said solenoid.

The transfer device of the four-wheel-drive vehicle according to the present invention as summarized above functions in the following manner. The solenoid is energized and actuated by the switch. The changeover hydraulic valve is thus actuated by the solenoid and operates the hydraulic actuator. The hydraulic actuator moves the rail. Thus the transfer clutch is disengaged, whereby the power is transmitted by two-wheel drive. The hydraulic actuator is operated by the changeover valve to actuate the rail. Thus the transfer clutch is engaged by meshing of the sleeve. As a result, the power is transmitted by the four-wheel-drive.

The nature, utility, and further features of the present invention will be more clearly understood from the following detailed description with respect to a preferred embodiment of the invention with reference to the accompanying drawings.

DETAILED DESCRIPTION OF A PREFERRED EMBODIMENT

Figure 1:
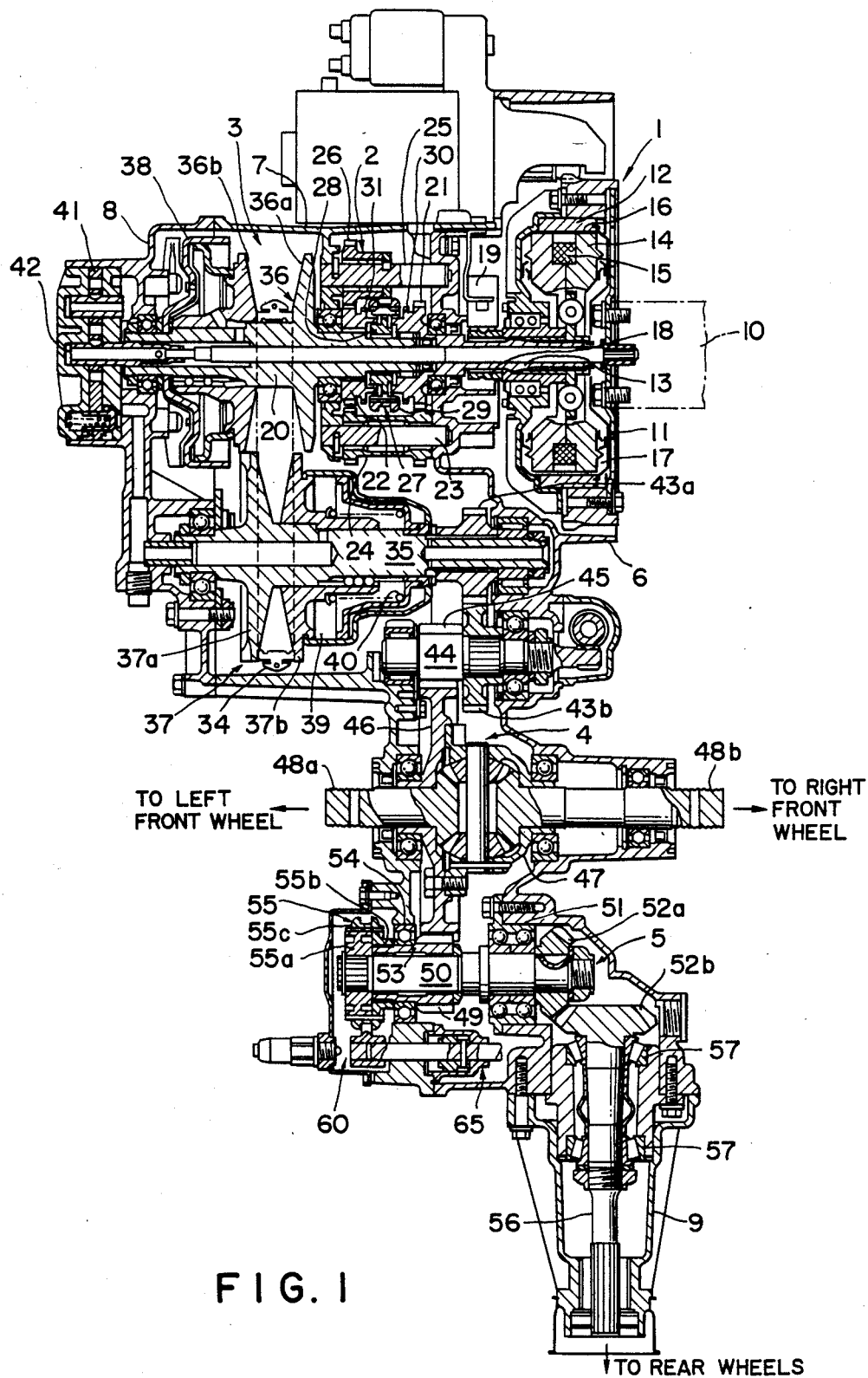
FIG. 1 is a sectional a driving system of a four-wheel-drive vehicle in which the present invention is applied.

Referring to FIG. 1, a belt-type continuously variable transmission of horizontal transaxle type with an electromagnetic powder clutch will first be described.

The principal units of the system shown in FIG. 1 are an electromagnetic powder clutch 1 coupled on its driving side to a crankshaft 10 of an engine (not shown), a forward/reverse changeover device 2, an continuously variable transmission 3, a front differential assembly 4, and a transfer device 5. The electromagnetic powder clutch 1 is enclosed in one part of a clutch housing 6. The clutch housing 6 at another part thereof is connected to a main case 7. A side case 8 is connected to the main case 7 on its side opposite to that of the clutch housing 6. Within the space enclosed by the clutch housing 6, the main case 7 and the side case 8, there are the transmission device 2, the continuously variable speed changer 3, the front differential assembly 4, and the transfer device 5. An extension case 9 is connected to a rear side of the main case 7 and houses a rear drive shaft 56.

The electromagnetic powder clutch 1 has an annular drive member 12. This drive member 12 is connected integrally by a drive plate 11 to the crankshaft 10. The clutch 1 also has a driven member 14. The driven member 14 is coupled by a spline to an input shaft 13. A magnetizing coil 15 is fitted around the outer periphery of the driven member 14. The annular drive member 12 is disposed coaxially around the driven member 14. A gap 16 is formed between the drive member 12 and the driven member 14. The gap 16 contains electromagnetic powder. Furthermore, the driven member 14 provided with the coil 15 has a slip ring 18 at an end. An electric power supply brush 19 is in sliding contact with the slip ring 18. In addition, the slip ring 18 is connected electrically to the coil 15 through wiring in the driven member 14. Thus a clutch current circuit is formed.

When the clutch current is passed through the coil 15 and the coil 15 is excited, the driven member 14 is magnetized to produce a magnetic flux passing through the drive member 12. The magnetic powder is aggregated in the gap by the magnetic flux and the driven member is engaged with the drive member by the powder.

On the other hand, when the clutch current is cut off, the coupling force between the drive and driven members 12 and 14 due to the electromagnetic powder disappears. Thus the drive and driven members 12 and 14 are disengaged from one another.

The control of the clutch current in this case is carried out in an interlocked manner with the operation of the forward/reverse shifting device 2. By this arrangement, the clutch 1 is automatically engaged and disengaged at the time of shifting from the P (parking) or N (neutral) range to D (forward drive) or Ds (sporty drive) range or R (reverse) range.

The transfer device 2 is provided between the input shaft 13 extending from the clutch 1 and a primary shaft 20 disposed coaxially and contiguously to the input shaft 13. More specifically, a reverse drive gear 21, serving as a forward engaged side is formed at the inner end of the input shaft 13. A gear 22 of the engage side for reverse driving is rotatably fitted on the primary shaft 20. These gears 21 and 22 are in enmeshed relationship via a counter gear 24 supported on a shaft 23 and an idler gear 26 supported on a shaft 25. Between the primary shaft 20 and the gears 21 and 22 is provided a changeover mechanism 27. The gears 21, 24, 26, and 22 are constantly enmeshed and are coupled to the driven member 14 having the coil 15 of the clutch 1. At the time of clutch disengagement, the inertial mass of this part is relatively large. Accordingly, the changeover mechanism 27 is so adapted that a sleeve 29 splined to a hub 28 of the primary shaft 20 is coupled by meshing with the gears 21 and 22 by way of synchromechanisms 30 and 31.

By this provision, in the neutral position of the P or N range, the sleeve 29 of the changeover mechanism 27 meshes with the hub 28. Thus the primary shaft 20 is disengaged from the input shaft 13. Then, when the sleeve 29 is meshed with the gear 21 by way of the synchromechanism 30, the primary shaft 20 is coupled directly to the input shaft 13. Thus forward drive state of the D or Ds range is obtained. On the other hand, when the sleeve 29 is meshed conversely with the gear 22 by way of the synchromechanism 31, the input shaft 13 is coupled by way of the gears 21, 24, 26 and 22 to the primary shaft 20. As a result, the driving power of the engine is reversed, and reverse drive state of the R range is obtained.

In the continuously variable transmission 3, a secondary shaft 35 is provided parallel to and spaced apart from the primary shaft 20. The shafts 20 and 35 respectively support a primary pulley 36 and a secondary pulley 37 in mutually aligned positions. An endless driving belt 34 is passed around these pulleys 36 and 37. Each of the pulleys 36 and 37 is of split construction comprising a fixed or stationary pulley disk and a movable disk. The movable pulley disks 36b and 37b on one side are movable along their respective shafts 20 and 35 relative to the stationary pulley disks 36a and 37a on these respective shafts. The movable disks 36b and 37b are unitarily fixed to the pistons of respective hydraulic servo devices 38 and 39 mounted respectively behind these movable disks 36b and 37b. The movable disk 37b of the secondary pulley 37 is further provided therebehind with a compression coil spring 40 exerting a spring force thereon tending to move the pulley disk 37b in the axial direction for narrowing the pulley groove width.

A hydraulic fluid pump 41 is installed next to the primary pulley 36 as a hydraulic pressure control system. The pump 41 is a gear pump for high pressures. The pump drive shaft 42 of the pump 41 extends through the primary pulley 36, the primary shaft 20, and the input shaft 13 and is coupled directly to the crankshaft 10. While the engine is operating, hydraulic pressure is being maintained. Thus, by controlling the delivery hydraulic pressure of this pump 41, hydraulic fluid is supplied to and discharged from the hydraulic servo devices 38 and 39. In this manner, the pulley disk gaps of the primary pulley 36 and the secondary pulley 37 vary with a mutually reverse relation. Thus the pulley ratio of the driving belt 34 at the pulleys 36 and 37 varies continuously. As a result, driving power which has been varied continuously in this manner is transmitted to the secondary shaft 35.

The minimum pulley ratio on the high-speed stage of the continuously variable speed changer 3 is extremely small, for example, 0.5. For this reason, the rotational speed of the secondary shaft 35 is high. In view of this condition, the secondary shaft 35 is coupled by intermediate speed-reduction gears 43a and 43b to an output shaft 44. This output shaft 44 has a drive gear 45 meshed with a final gear 46 of the front differential assembly 4. The driving power is transmitted from this final gear 46, through a differential mechanism 47, to the axles 48a and 48b of the left and right front wheels.

The transfer device 5 has a transfer gear 49 meshed with the above mentioned final gear 46. This transfer gear 49 is rotatably fitted on and supported by a transfer shaft 50 extending in the left-right direction of the vehicle. This transfer shaft 50 is relatively short. This transfer shaft 50 is supported at an intermediate part thereof toward one end (toward the right as viewed in FIG. 1) by a angular bearing 51. At the end of the transfer shaft 50 adjacent to this double angular bearing 51 is fixedly mounted a bevel drive gear 52a. Therefore, deflection of the transfer shaft 50 can be reduced. Furthermore, noise can be lowered.

The shaft part 53 of the transfer gear 49 extends in the opposite direction (toward the left as viewed in FIG. 1) and is supported by a bearing 54. As more clearly shown on an enlarged scale in FIG. 2, a dog clutch 55 is provided between this shaft part 53 and the end part of the transfer shaft 50. The transfer clutch 55 has a hub 55a splined to the transfer shaft 50, a coupling 55b splined to the shaft part 53, and a sleeve 55c adapted to engage therewith by enmeshment. On the other hand, the above mentioned bevel drive gear 52a at the other end of the transfer shaft 50 is meshed with a bevel driven gear 52b (FIG. 1) formed at one end of a rear drive shaft 56. The rear drive shaft 56 is supported adjacent to the bevel driven gear 52b by a tapered roller bearing 57 and extends in the vehicle fore-and-aft direction. The rear drive shaft 56 extends coaxially within the extension case 9 and functions to transmit driving power further to the rear-wheel side.

An actuating device 60 and a hydraulic actuator 65 in the form of a piston-cylinder assembly are disposed within the main case 7 in the vicinity of the transfer clutch 55.

The operational system of the dog clutch will now be described with reference to FIG. 2.

First, the actuating device 60 has a rail 61 provided at one end with a fork 61a for engaging with the sleeve 55c of the dog clutch 55. This rail 61 is disposed parallel to and in the vicinity of the dog clutch 55. The rail 61 is provided near its other end with two partially spherical sockets for receiving a lock ball 62. Engagement of this lock ball 62 in these sockets determines the longitudinal positions of the rail 61 respectively for two-wheel and four-wheel-drive.

The above mentioned hydraulic actuator 65 is provided around the middle part of the rail 61 and operates to directly shift the rail 61. The main case 7 has a supporting part 7a formed therein. This supporting part 7a supports parts such as the rail 61. The actuator 65 has a hydraulic cylinder 66 encompassing the middle part of the rail 61 and fixed to the supporting part 7a. A hydraulic piston 68 is slidably fitted in the cylinder 66 and is connected to the rail 61 by a pin 67. Cylinder chambers 69a and 69b are defined on left and right sides of the piston 68 between the piston 68 and the cylinder.

A hydraulic changeover valve 70 is attached to the cylinder 66. This changeover valve 70 comprises essentially a valve chamber 71 and a spool 72 inserted slidably into the valve chamber 71. When the spool 72 is appropriately moved slidingly within the valve chamber 71, an inlet port 73a of the changeover valve 70 is communicatively connected to the cylinder chamber 69a or 69b via an outlet port 73b or 73c of the changeover valve 70. Simultaneously, the outlet port 73b or 73c is communicated with a drain port 73d or 73e. To the inlet port 73a is connected a line pressure passage 75 from a hydraulic pressure control device 74 of the continuously variable transmission 3. One end of the spool 72 is coupled by way of a rod 77 to the plunger of a solenoid 78. The spool 72 is thus actuated in sliding advancing and retracting movements in its axial direction. A return spring 76 is provided around the spool 72.

The electric power supply of the vehicle is connected to a contact point of a relay 79 by way of the solenoid 78. A 4WD switch 80 operated manually by the vehicle driver is connected to the coil of this relay 79. A lamp switch 81 is fixed to confront one end of the rail 61 and is electrically connected to a 4WD lamp 82.

The four-wheel-drive vehicle and changeover device of the above described organization operates in the following manner.

First, at the start of driving, the accelerator pedal is depressed. As a consequence, the engine speed increases. The electromagnetic powder clutch 1 thereupon is caused by the clutch current to engage and transmit the engine power. At this time, the transfer device 2 is operated into the forward driving position. The changeover mechanisms 27 thereupon operates to place the input shaft 13 and the primary shaft 20 in directly coupled state. Thus the engine power is inputted directly as it is into the primary pulley 36 of the continuously variable speed changer 3.

Then, the chamber of the hydraulic servo device 38 on the primary side in the continuously variable transmission 3 is drained. Then its belt-wrapped diameter is a minimum. For this reason, the speed stage becomes a low-speed stage of maximum speed-change ratio. Thereafter the engine speed rises together with the vehicle speed. In concert with this rise in speed, the primary pressure of the hydraulic servo device 38 becomes high. Consequently, the diameter of the portion of the primary pulley 36 becomes large. Thus the speed is continuously varied to the high speed stage side. Then the power is transmitted from the secondary shaft 35 via the intermediate speed-reduction gears 43a and 43b and the output shaft 44 to the front differential assembly 4.

On the other hand, the line pressure for hydraulic control of the continuously variable transmission 3 is being applied through the hydraulic pressure passage 75 to the inlet port 73 of the changeover valve 70 for two-wheel or four-wheel-drive. Then, when the 4WD switch 80 is turned OFF, the relay 79 places the solenoid 78 in deenergized state. The plunger of the solenoid therefore is not shifted outwardly. Consequently, the spool 72 of the changeover valve 70 is shifted in one direction (toward the right in FIG. 2) by the return spring 76. Thus the inlet port 73a communicates with the outlet port 73c, and the outlet port 73b becomes communicative with the drain port 73d. For this reason, the line pressure is applied through the outlet port 73c into the cylinder chamber 69b of the hydraulic actuator 65. Thus the piston 68 operates to move the rail 61 together therewith toward the left as viewed in FIG. 2. The dog clutch 55 thereupon disengages wherein the sleeve 55c is meshed with only the hub 55a. Therefore, the driving power transmitted into the front differential assembly 4 is transmitted to only the front wheels. Thus the driving becomes two-wheel drive for FF.

Figure 2:
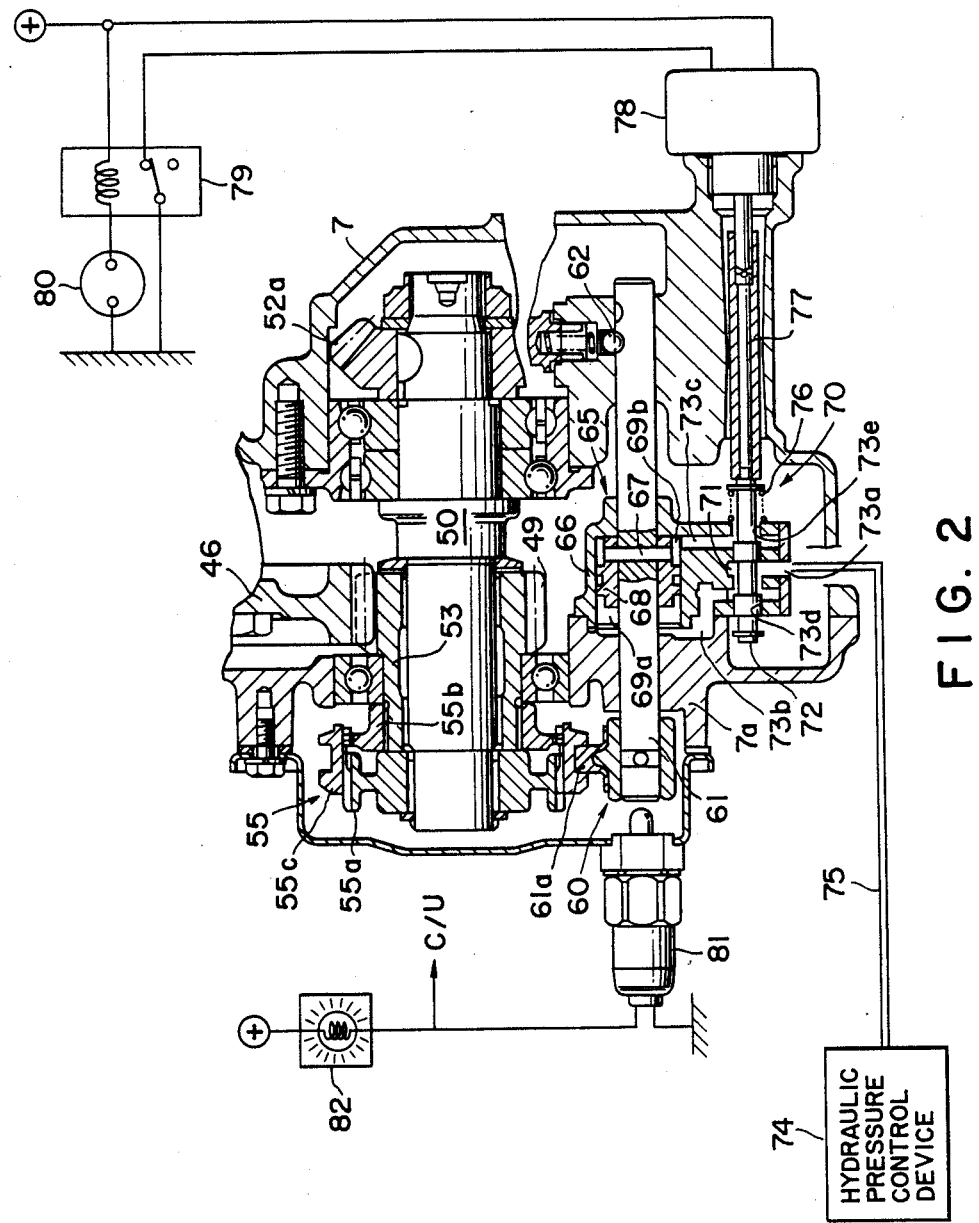
FIG. 2 is a sectional view of a transfer device according to the present invention.

Then, when the 4WD switch 80 is turned ON as indicated in FIG. 2, the solenoid 78 is energized. The spool 72 of the changeover valve 70 is therefore moved in the opposite direction (leftward as viewed in FIG. 2). The hydraulic line pressure is thereby changed over to be applied through the inlet port 73a and the outlet port 73b into the cylinder chamber 69a of the hydraulic actuator 65. Consequently, the rail 61 is moved to the right as viewed in FIG. 2. In concert with this movement, the sleeve 55c of the dog clutch 55 meshes with the coupling 55b. The transfer gear 49 and the transfer shaft 50 thereby become an integral member. Thus driving power is transmitted to also the rear-wheel by way of the transfer device 5 having the dog clutch 55, the rear drive shaft 56, and other parts. Therefore the power is transmitted by the four-wheel-drive.

At the same time, the lamp switch 81 is turned ON by the rail 61. The 4WD lamp 82 is thereby lit.

While the present invention has been described above with respect to one embodiment thereof, the invention can be applied also to a four-wheel-drive including an automatic transmission.

The advantageous features and effectiveness of the present invention are as follows.

According to the transmission device of transfer-clutch type of a part-time type four-wheel-drive vehicle, the clutch is operated by a hydraulic actuator. Therefore the actuator can be miniaturized, and changing over between two- and four-wheel-drives can always be carried out positively.

In the section of the clutch of the transfer device, the operational mechanisms, the hydraulic actuator, the changeover valve, and the solenoid are arranged together in an integrated manner. Therefore maintenance is easy, and interchangeability of two-/four-wheel-drive vehicles becomes simple.

The hydraulic actuator and the changeover valve are enclosed with a single case. Therefore, the construction is simplified, and the circulation of the hydraulic fluid is facilitated.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A transfer device of a part-time type of a four-wheel-drive vehicle driven by an engine in which driving power of the engine is transmitted directly to either of the front and rear wheels and is transmitted selectively to the other wheels by way of a transfer clutch of a transfer device, said device comprising:
    a shiftable sleeve forming a member of said clutch;
    a rail movable in reciprocating movement to shift said sleeve thereby to engage or disengage said clutch;
    a hydraulic actuator for actuating said rail in said reciprocating movement;
    hydraulic pressure supply means for supplying hydraulic pressure to said hydraulic actuator;
    a changeover valve for controlling the hydraulic pressure to be applied to the hydraulic actuator;
    a solenoid for controllably actuating said changeover valve; and
    a four-wheel-drive switch for controlling said solenoid by supplying or cutting off energizing current to or from said solenoid.

2. The drive changeover device according to claim 1, wherein said hydraulic actuator is a piston-cylinder assembly having a piston slidable in a cylinder, said cylinder enclosing said rail slidably therein, said piston being fixed to the rail.

3. The drive changeover device according to claim 1, wherein said changeover valve is formed integral with the hydraulic actuator.

4. The drive changeover device according to claim 1, wherein said hydraulic pressure supply means includes a hydraulic pressure control device.

5. The drive changeover device according to claim 1, wherein said rail fixedly supports at one end thereof a fork which engages the sleeve.

6. The drive changeover device according to claim 1, wherein said rail has partially spherical sockets into which a lock ball engages selectively to determine the longitudinal positions of the rail.

7. The drive changeover device according to claim 1, further comprising a lamp switch for lighting a 4WD lamp, said switch being disposed so as to be actuated by one end of the rail.

* * * * *